April 21, 1959 A. H. TOD 2,882,626

RECORD INDEX MEANS

Filed May 28, 1958

INVENTOR
ALLAN H. TOD by: Gary, Desmond & Parker
ATTYS

United States Patent Office 2,882,626

Patented Apr. 21, 1959

2,882,626

RECORD INDEX MEANS

Allan H. Tod, Charlottesville, Va., assignor to Acme Visible Records, Inc., Crozet, Va., a corporation of Delaware Application May 28, 1958, Serial No. 738,545

4 Claims. (Cl. 40—20)

This invention relates to improvements in visible record systems of the class employing a plurality of index cards arranged in chainlike groups and in overlapping relationship to expose indicia on the marginal portions of the cards.

More particularly, the present invention relates to relatively small index cards, provided with novel die-cut tabs or tongues, adapted for overlapping relationship with each other, in combination with a runway or support adapted to engage and retain the aforesaid index cards in a manner whereby the index cards may be disposed on the runway to permit removal of one or more index cards and replacement for insertion of one or more index cards in desired sequence, and whereby the overlapped index cards may be shifted on the runways as a group and removed therefrom or placed thereon in a group to convey the desired intelligence, and particularly to permit photographing of the indicia arranged in desired order or sequence on the runway.

For this purpose it is desired that the index cards of the aforesaid class be of a nature so that they can be readily inserted or removed, and when inserted they should desirably be in a position where they will readily remain in alignment, that is, in desired lateral or vertically aligned relationship of one card to another and in desired parallel or horizontal relationship to each other.

It is therefore a prime object of the present invention to provide index cards of the aforesaid class having die-cut tabs or tongues for ease of insertion on supporting or interlocking runways, with assurance of perfect alignment of the cards on the runway in the manner aforesaid.

A further object of the present invention is the provision of an index card having a die-cut tab or tongue of the class aforesaid which because of its relatively small nature is provided with a single tongue rather than a plurality of tongues, together with a pair of integral, oppositely extending tabs or ears of novel contour.

Other objects and advantages will be apparent from the following specification and accompanying drawings, wherein.

Figures 1, 2, 3, 5:
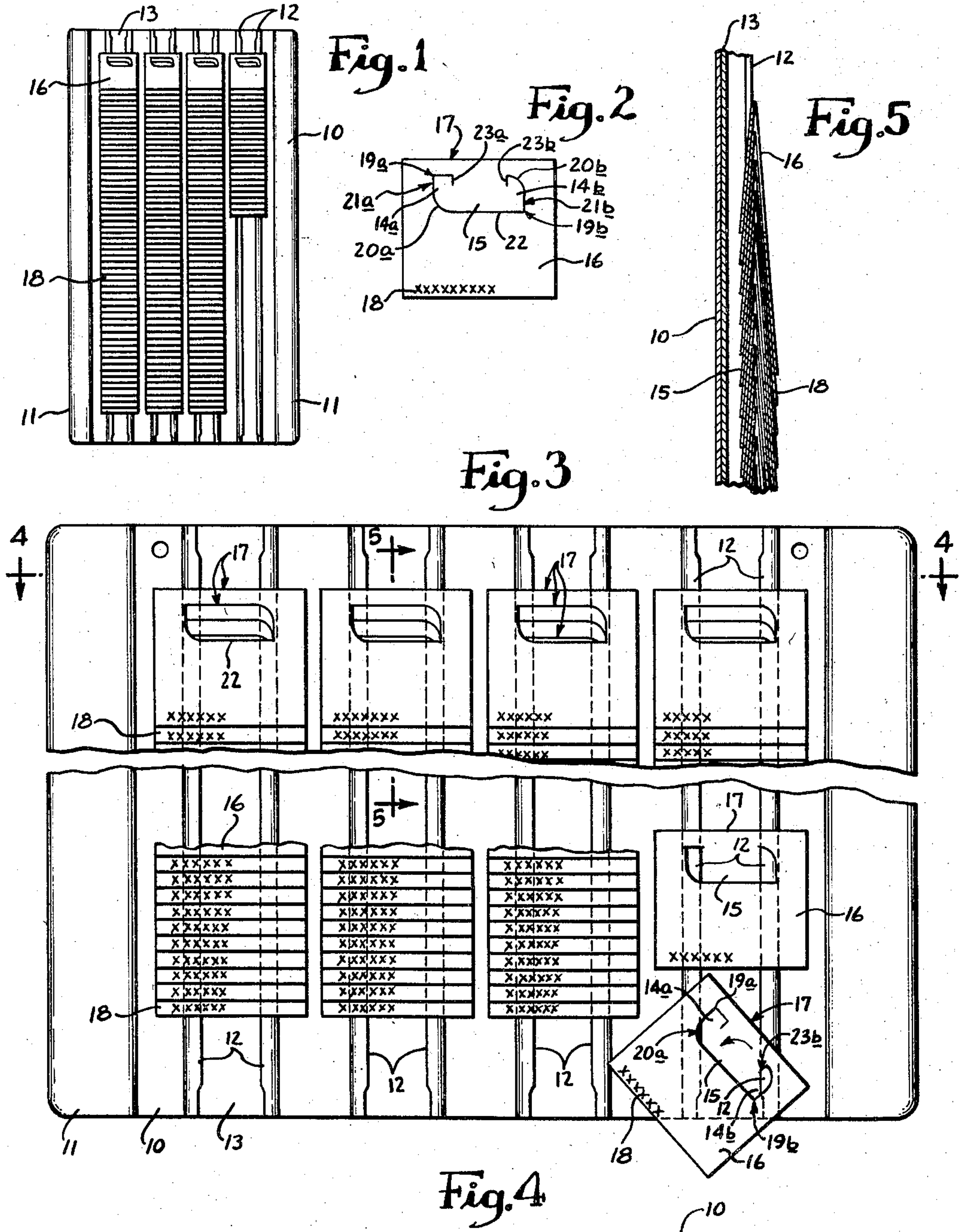
Fig. 1 is a plan view of a tray or record card holder provided with a plurality of runways, each carrying a group of relatively small index cards arranged in chainlike groups or in overlapping relationship to expose marginal portions of the adjacent, aligned cards.
Fig. 2 is a plan view of a novel die-cut index card formed in accordance with the present invention.
Fig. 3 is a fragmentary, enlarged plan view of the assembly shown in Fig. 1, and further illustrating the operative engagement and association of index cards to the supporting tray.
Fig. 5 is a fragmentary section on the line 5—5 of Fig. 3.
Figure 4:
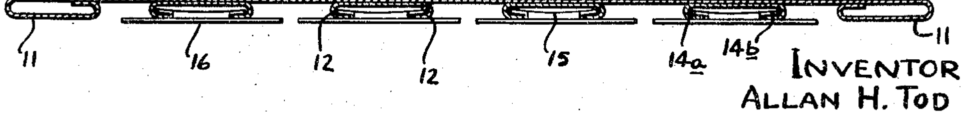
Fig. 4 is a section on the line 4—4 of Fig. 3.

Referring to the drawings, reference numeral 10 generally indicates a sheet metal panel, the opposite longitudinal edge portions 11, 11 being return bent and folded to form tubular edge portions which serve as stiffening members. Intermediate these edge portions there is secured to the face portion 10 a plurality of runways 13, each formed of an elongated strip of metal providing a base or web, and a pair of laterally spaced, parallel, coplanar guide flanges 12, 12 spaced from one face or web portion of the runway 13 and projecting toward each other, these flanges 12, 12 being adapted to receive and engage the tabs or ears **14*a* and 14*b* extending in opposite directions integral from the tongue 15, all as a die-cut unitary component on the index card 16**.

These record cards 16, conventionally of flexible paperboard, are in accordance with the present invention of relatively small size, such as of a width of approximately 1½ inches, and desirably of equal length, although not restricted thereto. The die-cut comprising the tongue 15 and the oppositely laterally projecting integral ears or tabs **14*a* or 14*b* is formed so that the general arrangement of the die-cut, i.e., the portion thereof defined by the line of severance 22, is parallel to one edge of the card, and parallel to a line passing through the opposed edges of the ears, said opposed ear edges being spaced from the card edge 17 a distance equal to the degree to which it is desired that the opposite edges of the cards will be spaced from each other to expose indicia inscribed or typed in the marginal edge portions as shown at 18**.

The width of the die-cut at its widest point embracing the tongue 15 and the integral tabs **14*a* and 14*b*, between the parallel opposed linear outer ear edge portions 21*a* and 21*b*, is substantially equal to the internal width between a pair of flanges 12, 12 so that when a card 16 is engaged on a runway 13, portions 21*a* and 21*b* will serve to hold the card 16 in rectangular alignment on the runway 13** and with the edges of the card in horizontal and vertical alignment with each other, all uniformly edgewise spaced in overlapping relationship.

In accordance with the present invention, the aforesaid relationship is obtained and retained by reason of the indicated parallel, side-edge rectilinear relationship of the tab or ear portions **21*a* and 21*b*, coupled with their rectangular edge formation as at 19*a* and 19*b* in one opposed end of the tabs 14*a* and 14*b*, respectively, and their arcuate formation 20*a* and 20*b* at the opposite ends of the respective tabs 14*a* and 14*b***.

Thus, as appears in detail in Fig. 3, a card 16 may be engaged between a pair of runway flanges 12, 12 by disposing the card 16 in angular relationship to the runways, followed by manual depression of the tongue, and with engagement of first the portion between the slit **23*b* and the arcuate edge 20*b* beneath the right-hand one of a pair of flanges 12, 12, followed by depression of the tab 14*a* and smooth engagement of its round or arcuate edge 20*a* beneath the opposed flange, and then rotation of the engaged tab in the direction of the arrow as shown until it comes into rectangular alignment with the side edges of the card parallel to the side edges of the flanges 12, 12 and with the top and bottom edges of the card normal thereto or normal with the top and bottom edges of the base 10, aided by abutment of the root of tongue 15 at slit 23*a* against a left-hand flange 12**.

Thus, a card 16 may be brought into smooth interlocking engagement beneath a pair of flanges 12, 12 by first projecting or inserting the rounded, obliquely opposite edge portions **20*a* and 20*b* of a pair of oppositely extending tabs beneath the pair of flanges 12, 12 and then rotating the card so that its ears or tabs 14*a* and 14*b* come to general parallel alignment with the flange pairs 12, 12. In other words, the rectangular, obliquely opposite terminals 19*a* and 19*b* of the ears aid in forming abutments against further rotation so as to securely dispose the cards 16** in desired horizontal and vertical alignment on their runways on the base panel. By the same token a plurality of groups of cards arranged on a plurality of parallelly disposed runways can thus be disposed in alignment with each other, all in orderly manner.

The individual cards 16 may thus be suitably arranged in an orderly manner, as for example with the indicia thereon in alphabetical order, and being slidably retained may be spaced individually as for reception or removal of one or more cards in desirable order, or for shifting the whole or part of the cards engaged on one runway to another, the over-all object being, for example, to enable photographing and thus provide time-saving means for reproducing frequently changing lists, such as catalogs, directories, charts, price lists, etc.

Although the drawings illustrate that the record cards 16 are provided with tongues 15 having laterally projecting tabs terminating in obliquely opposed square corners, such as the corner **19*a* at the upper left-hand side and the corner 19*b* at the lower right-hand side, with the tongue 15 extending downwardly and with the indicia adapted to be disposed on the lower marginal edge 18 of the card, the card may be inverted in several ways. For example, it may be employed in a position upside down from that shown in Fig. 2, in which case the indica bearing marginal edge 18 would be the upper edge portion of the card, with the tongue 15 projecting upwardly. Another inversion is viewing the arrangement of Fig. 2 from the reverse side thereof so that, for example, the square corner 19*a* would be on the upper right-hand side and the corner 19*b*** would be on the lower left-hand side.

Thus although the preferred form of the invention has been shown and described, various modifications may be made in the details thereof without departing from its spirit, as comprehended in the accompanying claims.

I claim:

1. A flexible rectangular record card adapted to carry indicia on one marginal edge portion and cut within the confines thereof to define an integral depressible tongue having its root hinged on a line parallel and adjacent to the opposed marginal edge of the card, said tongue including an integral pair of laterally oppositely projecting tabs each formed with one obliquely opposed arcuate outer corner and one obliquely opposed rectangular corner defined by lines of severance from the card body, the rectangular corners being defined by lines parallel to the side edges of the adjacent card corners.

2. A flexible rectangular record card adapted to carry indicia on one marginal edge portion and cut within the confines thereof to define an integral depressible tongue adapted to be received within the confines of a pair of runway flanges projecting toward each other, said tongue having its root hinged on a line parallel and adjacent to the opposed marginal edge of the card and including an integral pair of laterally oppositely projecting tabs having defining side edge portions parallel to the adjacent side edges of the card and adapted thereby to be snugly slidably received between said flanges, said tabs being each formed with one obliquely opposed arcuate outer corner and one obliquely opposed rectangular corner defined by lines of severance from the card body, the latter being defined by lines parallel to the side edges of the adjacent card corners.

3. A flexible rectangular record card adapted to carry indicia on one marginal edge portion and cut within the confines thereof to define an integral depressible tongue having its root hinged on a line parallel and adjacent to the opposited marginal edge of the card, said tongue including an integral pair of laterally oppositely projecting tabs disposed generally parallel to the adjacent side edges of the card and partially severed from the tongue adjacent its root, said tabs being of like inverted shape and each formed with an outer rectangular corner defined by lines of severance from the card body parallel to the side edges of a card corner, and complemented by an opposed corner portion extending arcuately therefrom toward said tongue.

4. A flexible rectangular record card cut within the confines thereof to define a pair of tabs adapted to be projected beneath a spaced parallel pair of flanges extending toward each other on a supporting runway whereby a plurality of said cards are disposable on said runway above its flanges in overlapped edgewise regularly spaced groups, said tabs projecting laterally in opposite directions and generally parallel to the side edges of the card integrally from a unitary tongue joined to said card solely along a line parallel to its top and bottom edges and medially of the side edges between the tabs, said tabs being partially severed from the tongue adjacent its root portion, an upper outer defining end portion of one tab and the lower outer defining end portion of the other being rectangular and defined by lines parallel to the side edges of the card corners, the opposed outer defining end portions of said tabs being of convex contour.

References Cited in the file of this patent

UNITED STATES PATENTS

| | | |
|---|---|---|
| 1,177,715 | Marbach | Apr. 4, 1916 |
| 1,696,016 | Russell | Dec. 18, 1928 |